No. 771,812. PATENTED OCT. 11, 1904.
J. CRAWFORD.
TRAP.
APPLICATION FILED NOV. 16, 1903.
NO MODEL. 2 SHEETS—SHEET 1.
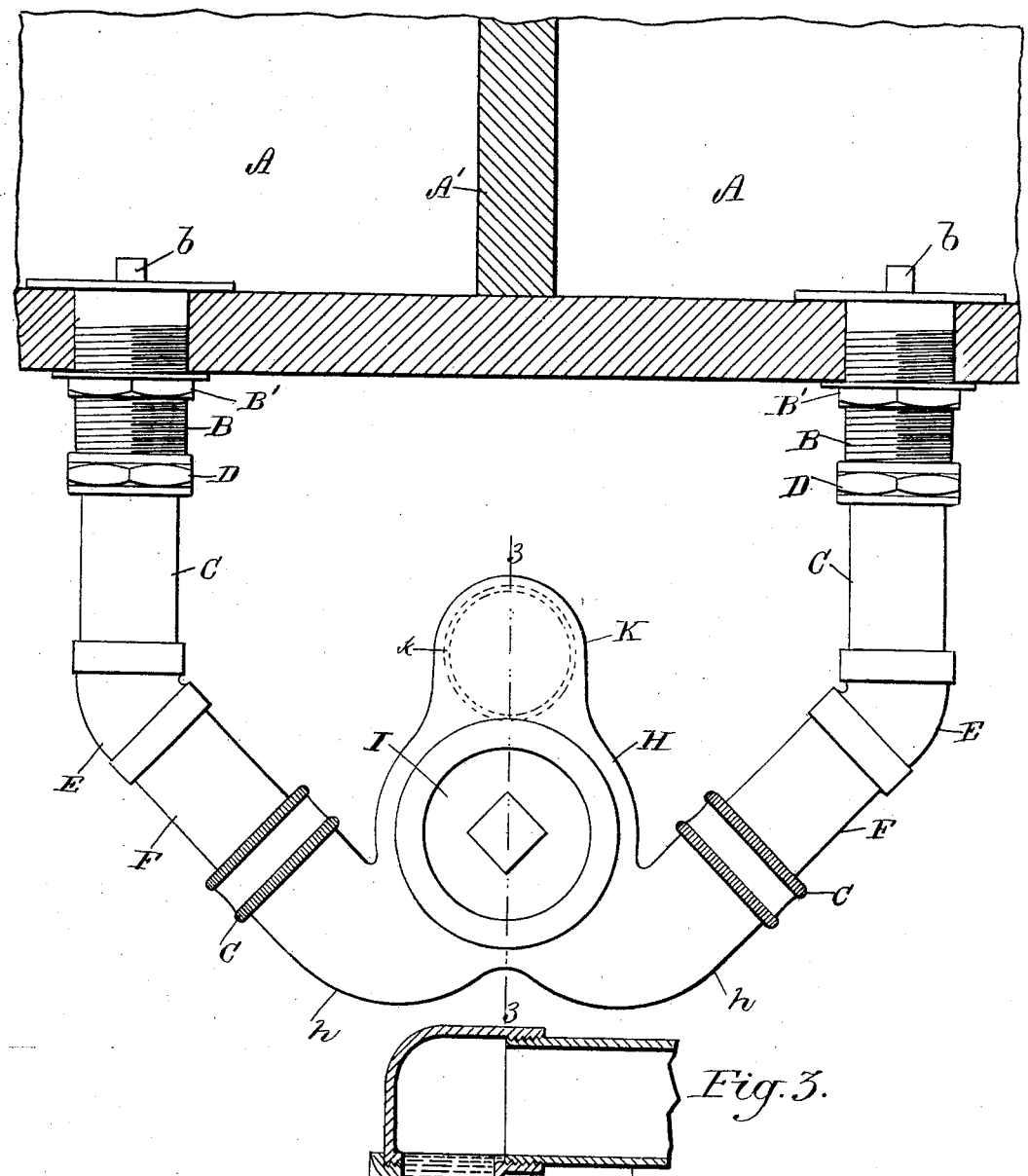

No. 771,812. PATENTED OCT. 11, 1904.
J. CRAWFORD.
TRAP.
APPLICATION FILED NOV. 16, 1903.
NO MODEL. 2 SHEETS—SHEET 2.
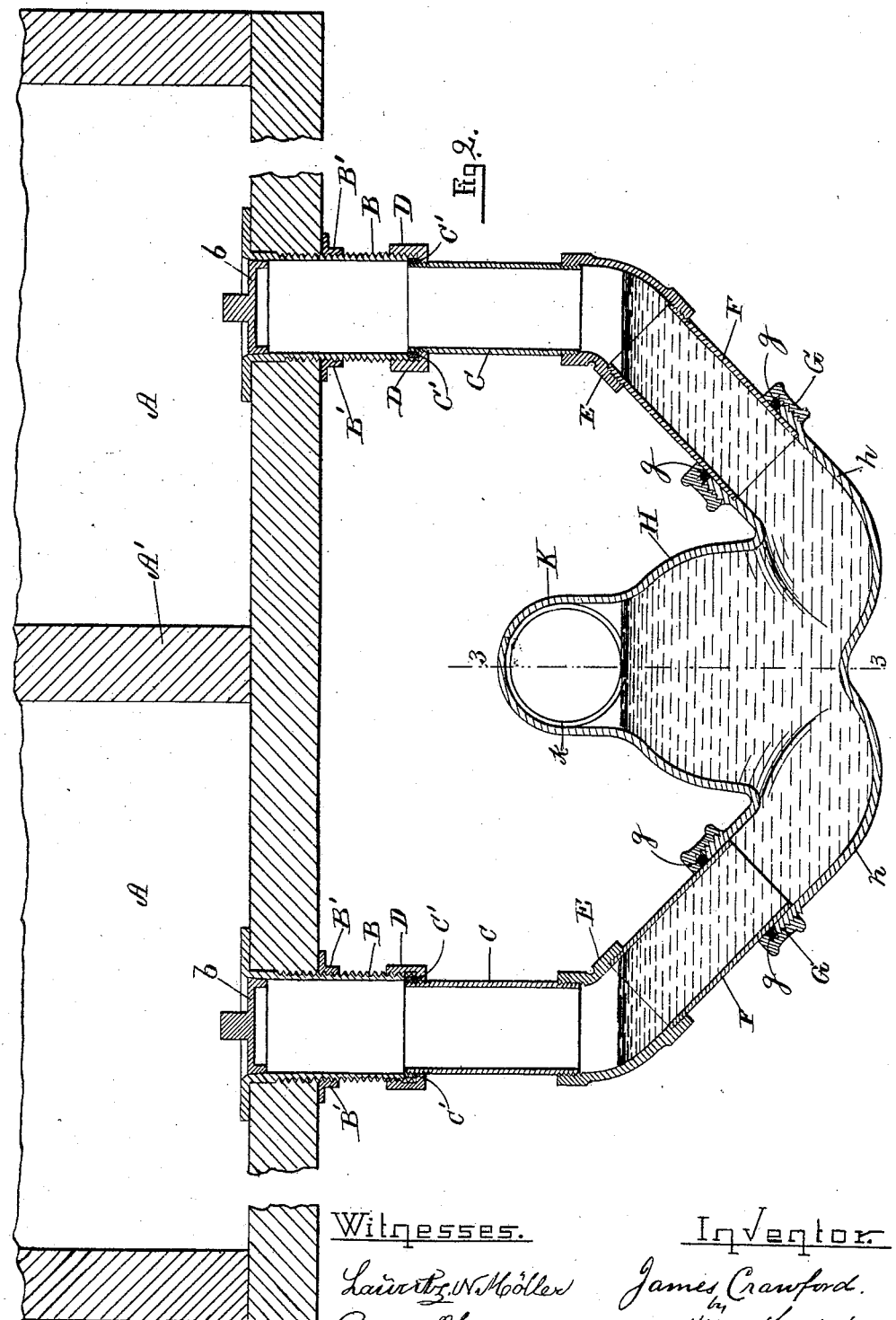

No. 771,812. Patented October 11, 1904.

UNITED STATES PATENT OFFICE.

JAMES CRAWFORD, OF BOSTON, MASSACHUSETTS.

TRAP.

SPECIFICATION forming part of Letters Patent No. 771,812, dated October 11, 1904.

Application filed November 16, 1903. Serial No. 181,303. (No model.)

*To all whom it may concern:*

Be it known that I, JAMES CRAWFORD, a citizen of the United States, and a resident of Boston, in the county of Suffolk and State of Massachusetts, have invented certain new and useful Improvements in Traps, of which the following is a specification.

This invention relates to improvements in traps particularly designed for two or more laundry trays, tubs, or sinks; and it is carried out as follows, reference being had to the accompanying drawings, wherein—

Figure 1 is a front elevation of the invention. Fig. 2 is a vertical longitudinal section of the same, and Fig. 3 is a cross-section on the line 3 3 shown in Figs. 1 and 2.

Similar letters refer to similar parts wherever they occur on the different parts of the drawings.

In Fig. 2, A A represent a pair of laundry trays or tubs, on which A' is the division-wall, as is usual in devices of this kind. Through a perforation in the bottom of each tray is inserted a thimble B, provided at its upper end with a removable valve-plug $b$, as shown. The said thimble is exteriorly screw-threaded and provided with a lock-nut B', adapted to be screwed against the under side of the tray, so as to secure said thimble to the bottom of the tray, as shown.

To the lower end of each thimble B is detachably secured a pipe C, the upper end of which is preferably screw-threaded and provided with a ring or collar C'.

D is a screw-threaded coupling by means of which the upper end of the pipe C is secured to the lower screw-threaded end of the thimble B, as shown in Fig. 2.

The pipe C is screw-threaded on its lower end and connected to a forty-five-degree elbow E, the lower screw-threaded end of which is similarly connected to an inclined pipe F, the lower end of which is adjustable in what is usually termed a "slip-joint," shown as composed of a coupling G, screw-threaded on its interior and screwed upon the upper end of an inclined branch $h$, the lower upturned end of which is connected to or made integral with a vertically-disposed cylindrical trap H, as shown. By having the pipes F adjustable in the branches $h\ h$ said pipes and their thimbles can be adjusted to fit the perforations in the bottom of the trays in case the outlets from the trap should not be centrally located between such thimble-perforations.

$g$ is an annular packing interposed between the coupling G and the upper end of the branch $h$, so as to cause a water-tight connection between the pipe F and branch $h$.

The trap H is provided at front with a screw-threaded removable cap I, which is normally secured water-tight to said trap and capable of being removed from the latter when desired to cleanse the trap from impurities or obstructions, as may be needed from time to time, and this can readily be done by inserting the hand through the opening in the front of the trap after the cover I is removed.

At the upper rear end of the trap H is a horizontal discharge branch K, to which is connected a pipe $k$, leading to the sewer.

It will be noticed that the curved branches $h\ h$ where they enter the trap H are located at inclinations to the vertical, by which the liquid discharged from one of the trays is caused to travel in a curved path within the trap before passing out therefrom, and if the contents of both trays should be simultaneously discharged the liquids entering the trap from the respective inclined branches will be intermixed, so as to break up any sediment or accumulations, and thus conduct freely the liquid and any residue that may exist therein out through the discharge-pipe leading to the sewer.

It will be noticed by reference to Fig. 2 that by the construction shown a liquid seal is obtained in the trap, causing the branches $h\ h$ to be sealed by the liquid where they enter the trap, thus preventing sewer-gas from entering into the room where the sinks or trays are located.

In practice I connect the trap to a pair of trays, as shown; but, if so desired, additional branches may be attached to the discharge-pipes, if required, to utilize one and the same trap for a multiple of trays or sinks without departing from the essence of my invention.

What I wish to secure by Letters Patent and claim is—

The herein-described trap for laundry-tubs and the like, comprising a vertically-disposed trap having an aperture at one side and a removable plug closing said aperture and an upper discharge-opening the lower edge of which is above the upper edge of said aperture, inclined branches communicating with the opposite sides of the lower end of the trap, the under sides of the lower ends of said branches being curved upwardly, endwise-adjustable pipes connected to said branches, and intermediate pipe connections to the tubs, substantially as described and for the purpose specified.

In testimony whereof I have affixed my signature in presence of two witnesses.

JAMES CRAWFORD.

Witnesses:
ALBAN ANDRÉN,
LAURITZ N. MÖLLER.